(12) United States Patent
Candelore et al.

(10) Patent No.: US 11,889,147 B2
(45) Date of Patent: Jan. 30, 2024

(54) DISPLAY OF SIGNING VIDEO THROUGH AN ADJUSTABLE USER INTERFACE (UI) ELEMENT

(71) Applicant: SONY GROUP CORPORATION, Tokyo (JP)

(72) Inventors: Brant Candelore, Poway, CA (US); Adam Goldberg, Fairfax, VA (US); Robert Blanchard, Escondido, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/453,553

(22) Filed: Nov. 4, 2021

(65) Prior Publication Data
US 2023/0133869 A1 May 4, 2023

(51) Int. Cl.
*H04N 21/44* (2011.01)
*G06F 9/451* (2018.01)
(Continued)

(52) U.S. Cl.
CPC ....... *H04N 21/44008* (2013.01); *G06F 9/451* (2018.02); *G06F 16/74* (2019.01);
(Continued)

(58) Field of Classification Search
CPC ......... H04N 21/44008; H04N 21/2187; H04N 21/47217; H04N 21/84; H04N 21/8547; G06T 7/70; G06T 2207/10016; G06T 2207/20081; G06T 2207/20084; G06T 2207/30196; G06F 9/451; G06F 16/74; G06F 16/787; G06V 20/46; G06V 40/28; G06V 20/41; G06V 10/95; G06V 10/225
(Continued)

(56) References Cited

U.S. PATENT DOCUMENTS 10,097,785 B2  10/2018  Shintani et al.
2002/0075407 A1*  6/2002  Cohen-Solal .... H04N 21/44008
                                                 348/565
(Continued)

FOREIGN PATENT DOCUMENTS

JP    5346797 B2    11/2013

OTHER PUBLICATIONS

"Ice Age in ASL", The Sign Language Company, URL: https://signlanguageco.com/ice-age-in-asl/, Dec. 6, 2012, 03 pages.
(Continued)

*Primary Examiner* — Alfonso Castro
(74) *Attorney, Agent, or Firm* — CHIP LAW GROUP

(57) ABSTRACT

An electronic device and method are provided for display of signing video through an adjustable user interface (UI) element. The electronic device receives a first media stream that includes a video. The electronic device determines a location of a signer in the video. The electronic device extracts a video portion that corresponds to the determined location in the video. The electronic device controls a playback of the video on the display device. The electronic device controls the display device based on the playback to render the UI element on the display device and display the extracted video portion inside the UI element.

15 Claims, 7 Drawing Sheets

(51) Int. Cl.
*G06F 16/74* (2019.01)
*G06V 20/40* (2022.01)
*G06V 10/22* (2022.01)
*H04N 21/2187* (2011.01)
*H04N 21/472* (2011.01)
*H04N 21/84* (2011.01)
*G06T 7/70* (2017.01)
*G06F 16/787* (2019.01)
*G06V 40/20* (2022.01)
*G06V 10/94* (2022.01)
*H04N 21/8547* (2011.01)

(52) U.S. Cl.
CPC .............. *G06F 16/787* (2019.01); *G06T 7/70* (2017.01); *G06V 10/225* (2022.01); *G06V 10/95* (2022.01); *G06V 20/41* (2022.01); *G06V 20/46* (2022.01); *G06V 40/28* (2022.01); *H04N 21/2187* (2013.01); *H04N 21/47217* (2013.01); *H04N 21/84* (2013.01); *H04N 21/8547* (2013.01); *G06T 2207/10016* (2013.01); *G06T 2207/20081* (2013.01); *G06T 2207/20084* (2013.01); *G06T 2207/30196* (2013.01)

(58) Field of Classification Search
USPC .......................................................... 725/88
See application file for complete search history.

(56) References Cited

U.S. PATENT DOCUMENTS

| | | | |
|---|---|---|---|
| 2008/0101463 A1* | 5/2008 | Lee | H04N 21/4316 375/E7.181 |
| 2014/0046661 A1 | 2/2014 | Bruner | |
| 2016/0098850 A1* | 4/2016 | Shintani | G06T 11/60 345/634 |
| 2018/0026733 A1* | 1/2018 | Yang | H04N 21/235 725/33 |
| 2020/0034609 A1* | 1/2020 | Chandler | G06V 10/764 |
| 2021/0034846 A1* | 2/2021 | Ko | G06N 3/088 |
| 2021/0235156 A1 | 7/2021 | Richman | |

OTHER PUBLICATIONS

Hal Hodson, "Google's Deepmind AI can lip-read TV shows better than a pro", Newscientist.com, Nov. 21, 2016, 05 pages.
Matthew Hutson, "Lip-reading artificial intelligence could help the deaf—or spies", Science.org., Jul. 31, 2018, 03 pages.

* cited by examiner

DISPLAY OF SIGNING VIDEO THROUGH AN ADJUSTABLE USER INTERFACE (UI) ELEMENT

CROSS-REFERENCE TO RELATED APPLICATIONS/INCORPORATION BY REFERENCE

None.

FIELD

Various embodiments of the disclosure relate to display of signing video. More specifically, various embodiments of the disclosure relate to an electronic device and method for display of signing video through an adjustable UI element.

BACKGROUND

Traditionally, a display device (such as a television or a mobile phone) receives broadcast media content or streaming media content that includes a video file and an audio file that is synchronized with the video file. Both the video file and the audio file are rendered simultaneously on the display device for viewing. In some instances, the media content (for example, the video) also includes a signer or interpreter who uses a sign language (for example, the American sign language (ASL)) to cater to viewers with hearing disabilities. However, the video portion of the signer (signing video) usually appears in the bottom corner of the video. The signing video may be too small for comfortable viewing or may obstruct areas of the main video (such as important notice in the main video). Existing systems do not offer simple user interface techniques to assist viewers with the hearing disabilities to conveniently view the media content and the signing video.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for display of signing video through an adjustable UI element is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
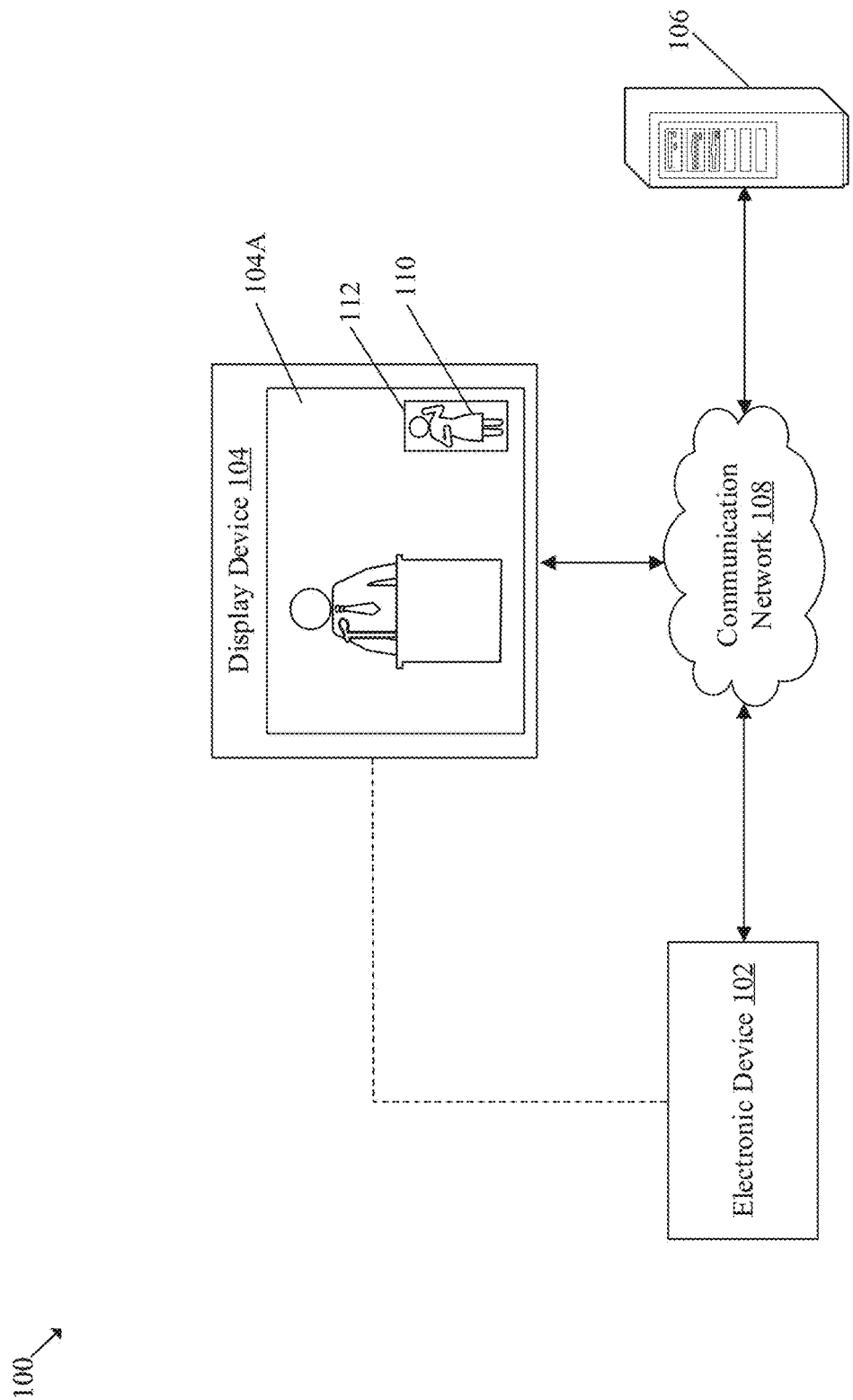
FIG. 1 is a diagram that illustrates an exemplary network environment for display of signing video through an adjustable user interface (UI) element, in accordance with an embodiment of the disclosure.

The following described implementations may be found in the disclosed electronic device and method for display of a sign language video (signing video) through an adjustable user interface (UI) element. Exemplary aspects of the disclosure provide an electronic device (for example, a smart television or a mobile device) which may be coupled to a display device. The electronic device may receive a media stream that may include a video. The electronic device may determine a location of a signer in the video. The signer may be an animated character or a person who may use a sign language to perform in the video. The electronic device may further extract, from the video, a video portion that corresponds to the determined location of the signer in the video. The electronic device may control a playback of the video on the display device. Based on the playback, the electronic device may control the display device to render a user interface (UI) element on the display device and display the extracted video portion inside the UI element. The UI element may be rendered as a picture-in-picture (PiP) window of an adjustable size. The electronic device may thereby provide an adjustable UI element to conveniently view the video of the signer along with a main video.

In an embodiment, the electronic device may receive metadata associated with the video. The metadata may include information that describes the location of the signer in the video at a plurality of time-stamps. The electronic device may determine the location of the signer in the video based on the received metadata. In another embodiment, the electronic device may detect a region in the video based on a difference between a background of the region and a background of a remaining portion of the video. The electronic device may detect the location of the signer in the video based on the detection of the region. In another embodiment, the electronic device may detect a border around the signer in the video. The electronic device may detect the location of the signer in the video based on the detection of the border. In some embodiments, the electronic device may be configured to detect hand signs associated with the sign language in the video based on an application of a neural network model on one or more frames of the video (for example, a live video broadcast). The electronic device may be configured to detect the location of the signer in the video based on the detection of the hand signs. The electronic device may further extract the video portion of the signer and control the display device to render the UI element (for example, the PiP window) on the display device based on the detected location of the signer. The electronic device may thereby automatically detect the location of the signer for the live video broadcast to generate the PiP window of the signer.

In an embodiment, the electronic device may provide the capability to customize the UI element (for example, the PiP window) according to user preferences. The electronic device may be configured to adjust the size of the UI element, a location of the UI element, a theme or a color scheme for the UI element, a preference to hide the UI element, and a schedule to render the UI element, based on user preferences. For example, the electronic device may receive a first input to change a current position of the PiP window to a first position that is different from the current position. The electronic device may control the display device to render the PiP window at the first position, based on the first user input. In another example, the electronic device may receive a second input to change a current size of the PiP window to a first size that is different from the current size. The electronic device may control the display device to change the current size of the PiP window to match the first size, based on the second input. The electronic device may thereby provide a simple and easy-to-use UI technique to adjust the size and position of the video portion of the signer based on the PiP window. Based on the adjustment of the position and size of the PiP window, the electronic device may provide a clear and magnified view of the video of the signer, and may enable unobstructed viewing of the main video (such as important notice in the main video).

FIG. 1 is a diagram that illustrates an exemplary network environment for display of signing video through an adjustable user interface (UI) element, in accordance with an embodiment of the disclosure. With reference to FIG. 1, there is shown a diagram of a network environment 100. In the network environment 100, there is shown an electronic device 102, a display device 104, and a server 106. The electronic device 102 may be communicatively coupled to the server 106, via a communication network 108. The electronic device 102 may be communicatively coupled to the display device 104, either directly or via the communication network 108. With reference to FIG. 1, there is further shown a main video 104A and a UI element 112 that displays a video of a signer 110.

In FIG. 1, the electronic device 102 and the display device 104 are shown as two separate devices; however, in some embodiments, the display device 104 may be integrated with the electronic device 102, without deviating from scope of the disclosure.

The electronic device 102 may include suitable logic, circuitry, and interfaces that may be configured to render a user interface (UI) element 112 on the display device 104. The electronic device 102 may receive a first media stream that includes a video. The electronic device 102 may further receive metadata associated with the video. The electronic device 102 may further extract the video portion that associated with a location of the signer 110 in the video. The electronic device 102 may control the display device 104 to display the extracted video portion inside the UI element 112. The electronic device 102 may include appropriate middleware and codecs, which may be capable of receiving and/or playback of media content (such as the video). In an embodiment, the electronic device 102 may be associated with a plurality of user profiles. Each user profile of the plurality of user profiles may include a collection of content items, settings or menu options, user preferences, and so on. The electronic device 102 may allow selection and/or switching of the user profile among the plurality of user profiles on a graphical user interface based on user input from a remote control or a touch screen interface. The electronic device 102 may include an infrared receiver or a Bluetooth® interface to receive control signals transmitted from the remote control corresponding to the button being pressed on the remote control. Examples of the electronic device 102 may include, but are not limited to, a smart television (TV), an Internet-Protocol TV (IPTV), a digital media player, a micro-console, a set-top-box, an Over-the-Top (OTT) player, a streaming player, a media extender/regulator, a digital media hub, a smartphone, a personal computer, a laptop, a tablet, a wearable electronic device, a head-mounted device, or any other display device with a capability to receive, decode, and play content from broadcasting signals over cable or satellite networks, streaming content over-the-air broadcast, content from internet-based communication signals, and so on. Examples of the content may include, but are not limited to, images, animations (such as 2D/3D animations or motion graphics), audio/video data, conventional television programming (provided via traditional broadcast, cable, satellite, Internet, or other means), pay-per-view programs, on-demand programs (as in video-on-demand (VOD) systems), or Internet content (e.g., streaming media, downloadable media, webcasts, etc.).

In an embodiment, the electronic device 102 may be configured to generate the UI element 112 (for example, a picture-in-picture (PiP) window) based on the received first media stream. The PiP window may be adjustable in size and position based on user input. The PiP window may display a portion of the main video 104A that includes a signer 110 who performs a sign language in the main video. The functionality of the generation of the UI element 112 (for example, the PiP window) may be integrated with the electronic device 102 by the manufacturer of the electronic device 102, or may be downloadable as an add-on application from the server 106 or an application store/marketplace.

The display device 104 may include suitable logic, circuitry, and interfaces that may be configured to render the UI element 112 that displays the extracted video portion of the signer. The display device 104 may be further configured to display the main video 104A being played back by the electronic device 102. In an embodiment, the display device 104 may be an external display device connected to the electronic device 102. For example, the display device 104 may be connected to the electronic device 102 (such as a digital media player or a personal video recorder) by a wired connection (such as a high-definition multimedia interface (HDMI) connection) or a wireless connection (such as Wi-Fi). In another embodiment, the display device 104 may be integrated with the electronic device 102 (such as a smart television). The display device 104 (such as a display screen with integrated audio speaker) may include one or more controllable parameters, such as, brightness, contrast, aspect ratio, color saturation, audio volume, etc. The electronic device 102 may be configured to control the parameters of the display device 104 by transmitting one or more signals over the wired connection (such as the HDMI connection). In one embodiment, the display device 104 may be a touch screen that may receive a user input via touch input. The display device 104 may be realized through several known technologies such as, but not limited to, at least one of a Liquid Crystal Display (LCD) display, a Light Emitting Diode (LED) display, a plasma display, or an Organic LED (OLED) display technology, or other display devices. In at least one embodiment, the display device 104 may be a display unit of a smart TV, a head mounted device (HMD), a smart-glass device, a see-through display, a heads-up-display (HUD), an in-vehicle infotainment system, a projection-based display, an electro-chromic display, or a transparent display.

The server 106 may include suitable logic, circuitry, and interfaces, and/or code that may be configured to store one or more media streams. The server 106 may be further configured to store metadata for determining the location of the signer in one or more videos. In some embodiments, the server 106 may be configured to train a neural network model for detection of hand signs associated with the sign language in the video. In some embodiments, the server may be configured to store the neural network model and training dataset for training the neural network model. The server 106 may be further configured to store user profiles associated with the electronic device 102, preferences associated with the UI element 112 for each user profile, usage history of the UI element 112 for each user profile, and so on. The server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, or a cloud computing server. In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the electronic device 102 as two separate entities. In certain embodiments, the functionalities of the server 106 can be incorporated in its entirety or at least partially in the electronic device 102, without departing from the scope of the disclosure.

The communication network 108 may include a communication medium through which the electronic device 102, the display device 104, and the server 106, and may communicate with each other. The communication network 108 may be one of a wired connection or a wireless connection Examples of the communication network 108 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may receive a first media stream that may include a video. The first media stream may be encoded in a standard digital container format for the transmission of the video. In an embodiment, the electronic device 102 may receive the first media stream from the server 106. In an embodiment, the electronic device 102 may be further configured to receive metadata associated with the video. The metadata may include information that describes the location of the signer 110 in the video at a plurality of time-stamps. The signer 110 may be an animated character or a person who may use a sign language to perform in the video. For example, the signer 110 may be a person who may interpret a spoken language in the video and convert the spoken language into the sign language.

In an embodiment, the electronic device 102 may be further configured to determine a location of the signer 110 in the video, based on the reception of the metadata. The determined location may include image coordinates of corners of a rectangular region of the video that includes the signer 110. In another embodiment, the electronic device 102 may be configured to apply a neural network model (shown in FIG. 2) on the video to determine the location of the signer 110 in the video. In another embodiment, the electronic device 102 may determine the location of the signer 110 in the video by image analysis based on a difference in backgrounds of a region around the signer 110 and the main video 104A, or based on detection of a border around the signer 110 in the video. The details of the application of the neural network model and the image analysis are provided, for example, in FIGS. 2 and 3B. In an embodiment, the electronic device 102 may be further configured to control the display device 104 to render a highlighting border around the signer 110 in the displayed video. The border may be rendered based on the determined location. In an example, the electronic device 102 may display the border to obtain user confirmation of the video portion of the signer in the video, in a case where the electronic device 102 identifies multiple candidates for the video portion of the signer 110 from the video.

The electronic device 102 may be further configured to extract a video portion that corresponds to the determined location of the signer 110 in the video. The video portion may be extracted from the rectangular region of the video. In an embodiment, the electronic device 102 may receive a second media stream that includes the extracted video portion. The second media stream may be different from the first media stream. The electronic device 102 may be further configured to control a playback of the video (for example, the main video 104A) on the display device 104. The electronic device 102 may be further configured to control the display device 104 to render the UI element 112 on the display device 104 and display the extracted video portion inside the UI element 112. The UI element 112 may be rendered as a picture-in-picture (PiP) window of an adjustable size and position.

In an embodiment, the electronic device 102 may be configured to customize the UI element 112 (PiP window) according to user preferences. For example, the electronic device 102 may be configured to adjust the size of the UI element 112, a location of the UI element 112, a theme or a color scheme for the UI element 112, a preference to hide the UI element 112, and a schedule to render the UI element 112, based on user preferences. For example, the electronic device 102 may receive a first input to change a current position of the PiP window to a first position that is different from the current position. The electronic device 102 may control the display device 104 to render the PiP window at the first position, based on the first user input. In another example, the electronic device 102 may receive a second input to change a current size of the PiP window to a first size that is different from the current size. The electronic device 102 may control the display device to change the current size of the PiP window to match the first size, based on the second input. The electronic device 102 may thereby provide a simple and easy-to-use UI technique to adjust the size and position of the video portion of the signer based on the UI element 112 (such as the PiP window). Based on the adjustment of the position and size of the UI element 112, the electronic device 102 may provide a clear and magnified view of the video of the signer, and may enable unobstructed viewing of the main video 104A (such as an important notice in the main video 104A).

Modifications, additions, or omissions may be made to FIG. 1 without departing from the scope of the present disclosure. For example, the network environment 100 may include more or fewer elements than those illustrated and described in the present disclosure.

Figure 2:
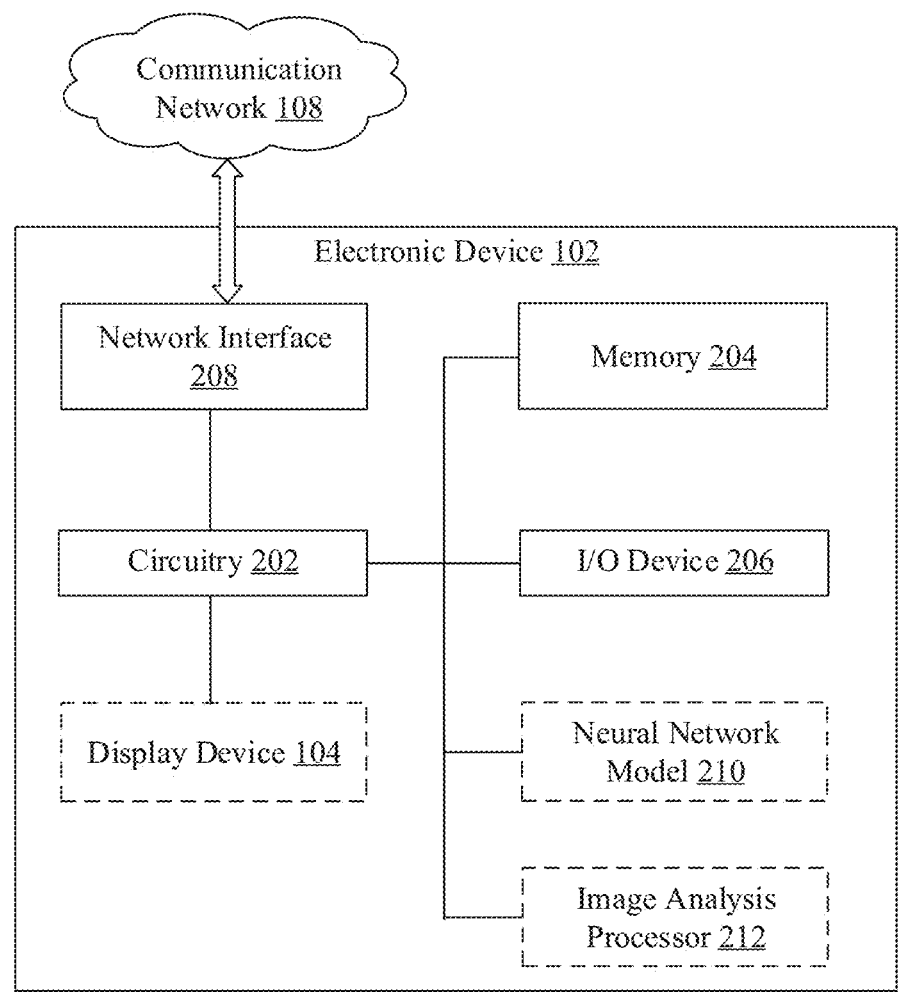
FIG. 2 is a block diagram of an exemplary electronic device for display of signing video through adjustable user interface (UI) element, in accordance with an embodiment of the disclosure.

FIG. 2 is a block diagram of an exemplary electronic device for display of signing video through an adjustable user interface (UI) element, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a network interface 208, and a neural network model 210. In at least one embodiment, the electronic device 102 may also include the display device 104. The circuitry 202 may be communicatively coupled to the memory 204, the I/O device 206, the network interface 208, the neural network model 210, and the display device 104.

The circuitry 202 may include suitable logic, circuitry, and interfaces that may be configured to execute program instructions associated with different operations to be executed by the electronic device 102. The different operations include determination of a location of a signer in the video, extraction of a video portion that corresponds to determined location of the signer in the video, and control of the display device 104 to render the UI element 112 on the display device 104 and to display the extracted video portion inside the UI element 112. The circuitry 202 may include one or more processing units, which may be implemented as an integrated processor or a cluster of processors that perform the functions of the one or more processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and interfaces that may be configured to store the program instructions to be executed by the circuitry 202. In an embodiment, the memory 204 may store the received first media stream, a second media stream, the received metadata, the determined location of the signer 110, and the extracted video portion. The memory 204 may be further configured to store one or more user profiles associated with the electronic device 102, preferences associated with the UI element 112 for each user profile, usage history of the UI element 112 for each user profile, sign language preference (for example, American sign language or British sign language) of each user profile, and so on. In some embodiments, the memory 204 may further store one or more preset positions and one or more preset sizes of the UI element 112. The memory 204 may store the one or more preset positions and the one or more preset sizes of the UI element 112 as defaults for all users or may store the one or more preset positions and the one or more preset sizes of the UI element 112 for each user profile. The memory 204 may be further configured to store predefined templates for image analysis, the neural network model 210, and the training dataset received from the server 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive one or more input(s) and provide one or more output(s) based on the received one or more input(s). The I/O device 206 which includes various input and output devices, may be configured to communicate with the circuitry 202. In an example, the electronic device 102 may receive, via the I/O device 206, the user input indicative of a change of a current position of the UI element 112 rendered on the display device 104. In another example, the electronic device 102 may receive, via the I/O device 206, the user input indicative of a change of a current size of the UI element 112 rendered on the display device 104. Examples of the I/O device 206 may include, but are not limited to, a remote console, a touch screen, a keyboard, a mouse, a joystick, a microphone, a display device (such as the display device 104), and a speaker.

The network interface 208 may include suitable logic, circuitry, and interfaces that may be configured to facilitate a communication between the circuitry 202 and the server 106 or the display device 104, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, a Bluetooth® receiver, an infrared receiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The neural network model 210 may be a computational network or a system of artificial neurons, arranged in a plurality of layers, as nodes. The plurality of layers of the neural network model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before, while training, or after training the neural network model 210 on a training dataset.

Each node of the neural network model 210 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model 210. All or some of the nodes of the neural network model 210 may correspond to the same or a different mathematical function.

In accordance with an embodiment, the circuitry 202 may train the neural network model 210 on one or more features related to the video, one or more features related to background of the signer 110 in the video, one or more features related to hand movements of the signer 110 in the video, and so on, to obtain the trained neural network model 210. The neural network model 210 may be trained to detect hand signs associated with the sign language in the video, and to detect the location of the signer 110 in the video based on the detection of the hand signs. In another embodiment, the neural network model 210 may be trained to distinguish a background of the signer 110 in the video from other portions of the video, and to detect the location of the signer 110 in the video based on the background. For example, the circuitry 202 may input the video, predetermined hand signs of the sign language (for example, the American sign language or the British sign language), and so on, to train the neural network model 210.

In training of the neural network model 210, one or more parameters of each node of the neural network model may be updated based on whether an output of the final layer for a given input (from the training dataset) matches a correct result based on a loss function for the neural network model. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

The neural network model 210 may include electronic data, which may be implemented as, for example, a software component of an application executable on the electronic device 102. The neural network model 210 may rely on libraries, external scripts, or other logic/instructions for execution by a processing device, such as the circuitry 202. The neural network model 210 may include code and routines configured to enable a computing device, such as the circuitry 202 to perform one or more operations for detection of hand signs associated with the sign language in the video. Additionally or alternatively, the neural network model 210 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 210 may be implemented using a combination of hardware and software.

Examples of the neural network model 210 may include, but are not limited to, a deep neural network (DNN), a convolutional neural network (CNN), R-CNN, Fast R-CNN, Faster R-CNN, an artificial neural network (ANN), (You Only Look Once) YOLO network, CNN+ANN, a fully connected neural network, a deep Bayesian neural network, and/or a combination of such networks. In certain embodiments, the neural network model 210 may be based on a hybrid architecture of multiple Deep Neural Networks (DNNs).

The image analysis processor 212 may include suitable hardware and software algorithms that may be configured to perform one or more image analysis techniques such as object detection, object recognition, image segmentation, motion detection, pose estimation, edge detection, template matching, and so on. For example, the image analysis processor 212 may perform template matching based on predefined features or templates associated with the shape and size of the portion of the signer 110 in the video. In another example, the image analysis processor 212 may perform edge detection to detect a visible border around the signer 110. In another example, the image analysis processor 212 may perform motion detection to distinguish an unmoving (static) region behind the signer 110 from the moving (dynamic) background of the main video 104A.

The functions or operations executed by the electronic device 102, as described in FIG. 1, may be performed by the circuitry 202. Operations executed by the circuitry 202 are described in detail, for example, in FIGS. 3, 4, 5, 6, and 7.

Figure 3:
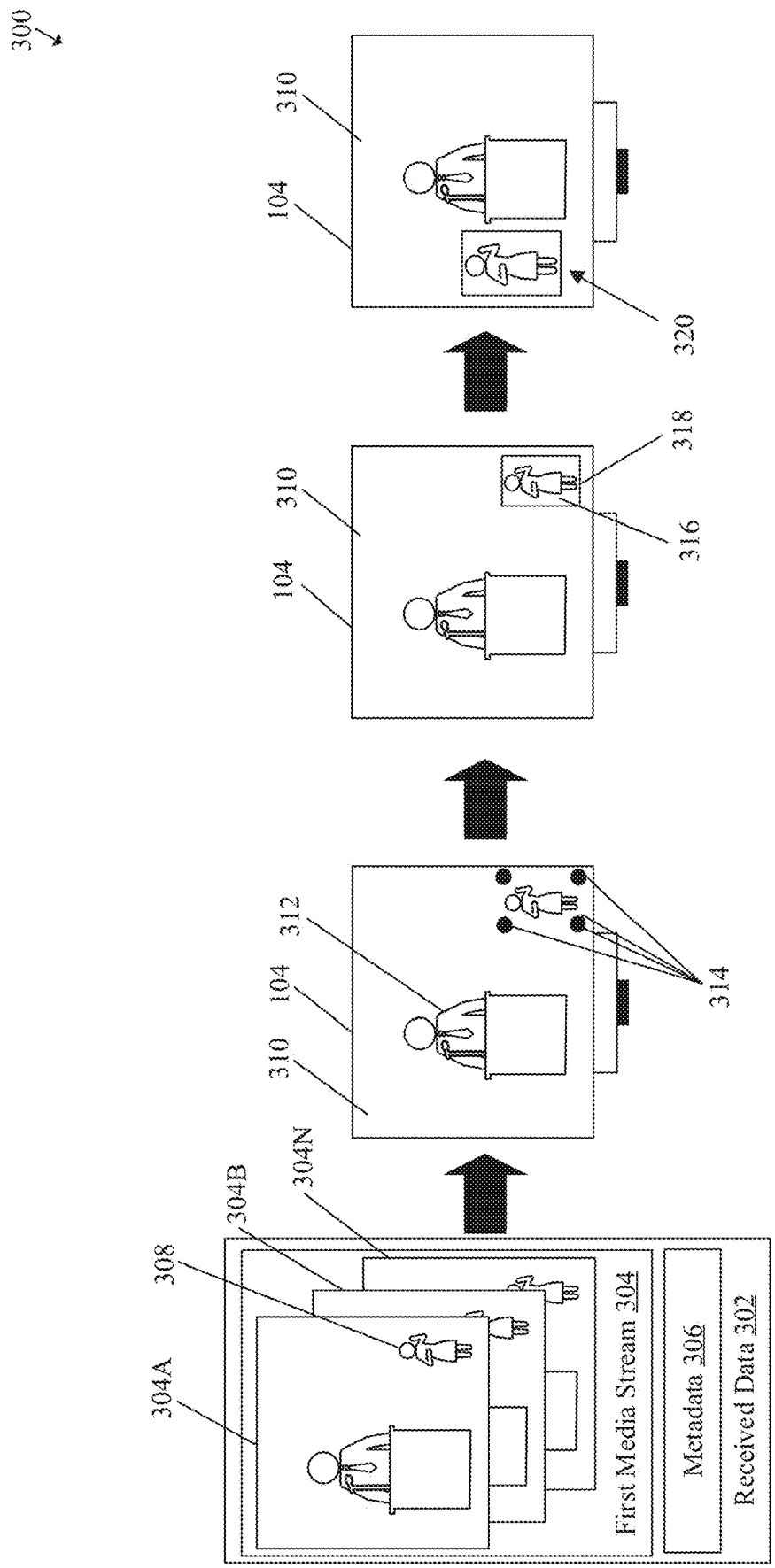
FIG. 3 is a diagram that illustrates an exemplary scenario for display of signing video through an adjustable user interface (UI) element based on metadata, in accordance with an embodiment of the disclosure.

FIG. 3 is a diagram that illustrates an exemplary scenario for display of signing video through an adjustable user interface (UI) element based on metadata, in accordance with an embodiment of the disclosure. FIG. 3 is explained in conjunction with elements from FIGS. 1 and 2. With reference to FIG. 3, there is shown an exemplary scenario 300. In the exemplary scenario 300, there is shown a block of received data 302. The received data 302 may include a first media stream 304 that may include one or more frames of a video, and metadata 306 associated with the video. The video may include a signer 308. The one or more frames may include a first frame 304A, a second frame 304B, up to an Nth frame 304N. With reference to FIG. 3, there is also shown a display device 104 associated with the electronic device 102. The display device 104 may be configured to display the one or more frames of the video (for example, the main video 310)

The first media stream 304 may include one or more frames of the video that may rendered on the display device 104. For example, the main video 310 may be encapsulated in the first media stream 304. In an embodiment, the circuitry 202 may receive the first media stream 304 from the server 106. In another embodiment, the circuitry 202 may the first media stream 304 from a server associated with a broadcasting network. In such a scenario, the first media stream 304 may include text information such as an electronic program guide (EPG) associated with the broadcasting channel.

The metadata 306 may include information associated with the video, and may be embedded in the analog signal or the digital signal of the video. By way of example, the metadata 306 may include information associated with a duration of the video, a title of the video, a resolution of the video, a type of codec and/or container associated with the video, information of one or more characters 312 or persons in the video (for example the main video 310), and the like. In an embodiment, the metadata 306 may include information associated with the signer 308 present in the video. The signer 308 may be an animated character or a person who may use a sign language to perform in the video. In an embodiment, the signer 308 may translate a language (for example, English) spoken by the one or more characters 312 in the video to a sign language (for example, the American Sign Language (ASL)). The metadata 306 may include information that may describe a location of the signer 308 in the video at a plurality of time-stamps. The location of the signer 308 may include image coordinates 314 which may correspond to corners of a rectangular region of the video that includes the signer 308. In an embodiment, the image coordinates 314 may be labeled in terms of pixel or image coordinates of the one or more frames of the video. Examples of the received metadata 306 at different time-stamps are presented in Table 1, as follows:

TABLE 1

Metadata Indicating Location of Signer in the Video at Different Time-Stamps

| Time Stamp | Signer Present | Image Coordinates |
| --- | --- | --- |
| 00:03:15:00-00:04:15:00 | Yes | ((x1, y1), (x2, y2), (x3, y3)(x4, y4)) |
| 00:04:30:04-00:04:31:54 | Yes | ((x1, y1), (x2, y2), (x3, y3)(x4, y4)) |
| 00:05:23:00-00:05:27:00 | Yes | ((x1, y1), (x2, y2), (x3, y3)(x4, y4)) |
| 00:07:45:00-00:08:15:30 | Yes | ((x1, y1), (x2, y2), (x3, y3)(x4, y4)) |
| 00:08:15:30-00:10:10:00 | No | NA |
| 00:10:10:00-00:12:32:10 | Yes | ((x5, y5), (x6, y6), (x7, y7)(x8, y8)) |

In an embodiment, the circuitry 202 may be configured to determine the location of the signer 308 at the plurality of time-stamps based on the received metadata 306. For example, the circuitry 202 may be configured to parse the received metadata 306 to determine the location of the signer 308. With reference to Table 1, the location of the signer 308 in the video at the plurality of time-stamps mentioned in the first column of Table 1 may be determined from the third column of the Table 1. Although Table 1 (third column) includes a set of four image coordinates indicating a rectangular boundary of the signer 308 in the video, the disclosure may not be so limited. The metadata 306 may include any number of coordinates depending on the shape (such as a polygonal shape) of the boundary of the signer 308.

The circuitry 202 may be further configured to extract a video portion 316 from the video. The extracted video portion 316 may correspond to the determined location in the video. For example, the video portion 316 may be extracted from the rectangular region of the video that corresponds to an area between the image coordinates 314 and that includes the signer 308. The circuitry 202 may be further configured to control a playback of the video on the display device 104. In an embodiment, the circuitry 202 may be configured to control the playback of the video on the display device 104 based on a user input. In an embodiment, the circuitry 202 may be configured to control the display device 104 to render a border around the signer 308 in the video based on the extracted video portion 316. The display device 104 may render the border based on the determined location of the signer 308 in the video. The border around the signer 308 may be rendered to distinguish the signer 308 from the one or more characters 312 in the video. In some embodiments, the circuitry 202 may highlight the border around the signer 308 in a bright color (for example, bright green color) to assist the user to locate signer 308 in the video.

The circuitry 202 may be configured to control the display device 104 to render a user interface (UI) element 318 on the display device 104, based on the playback. The UI element 318 may be rendered as a picture-in-picture (PiP) window. The PiP window may be of an adjustable size. For example, the circuitry 202 may be configured to adjust a size of the PiP window based on one or more user inputs. The circuitry 202 may be further configured to display the extracted video portion 316 inside the UI element 318 (for example, the PiP window). The extracted video portion 316 may include the signer 308. In an embodiment, the circuitry may connect the image coordinates 314 by lines and may copy the video portion 316 within those lines into the PiP window in real-time.

In an embodiment, the circuitry 202 may be configured to receive, from the server 106, a second media stream (for example, a second signal) that may be different from the first media stream 304. For example, the second media stream may include the video portion 316. In such scenario, the circuitry 202 may be configured to control a playback of the video from the first media stream 304 on the display device 104. The circuitry 202 may be further configured to control the display device 104 to render the UI element 318 on the display device 104. The circuitry 202 may control the display device 104 to display the extracted video portion 316 from the received second stream inside the UI element 318 in time synchronization with the playback of the video from the first media stream 304. The circuitry 202 may be configured to adjust a size of the PiP window in both the cases, namely, in a case where the video portion 316 is extracted based on the received metadata 306, and in a case where the video portion is received as the second media stream from the server 106.

In an embodiment, the circuitry 202 may be further configured to receive a first input to change a current position of the rendered UI element 318 (for example the PiP window) to a first location 320 that may be different from the current position. The circuitry 202 may also receive a second input to change a current size of the rendered UI element 318 (for example the PiP window) to a first size that is different from the current size. The circuitry 202 may be further configured to control the display device 104 to render the UI element 318 at the first location 320 in the first size, based on the first input and the second input. Details of the adjustment of the position and the size of the UI element 318 are provided, for example, in FIGS. 5 and 6. In an embodiment, the circuitry 202 may be configured to control the display device 104 to blur the signer 308 in the main video 310, in a case where the UI element 318 (such as the PiP window) containing the signer 308 is displayed. In another embodiment, the circuitry 202 may be configured to control the display device 104 to replace the video portion of the signer 308 in the main video 310 with background pixels of the main video, in a case where the UI element 318 containing the signer 308 is displayed.

Figure 4:
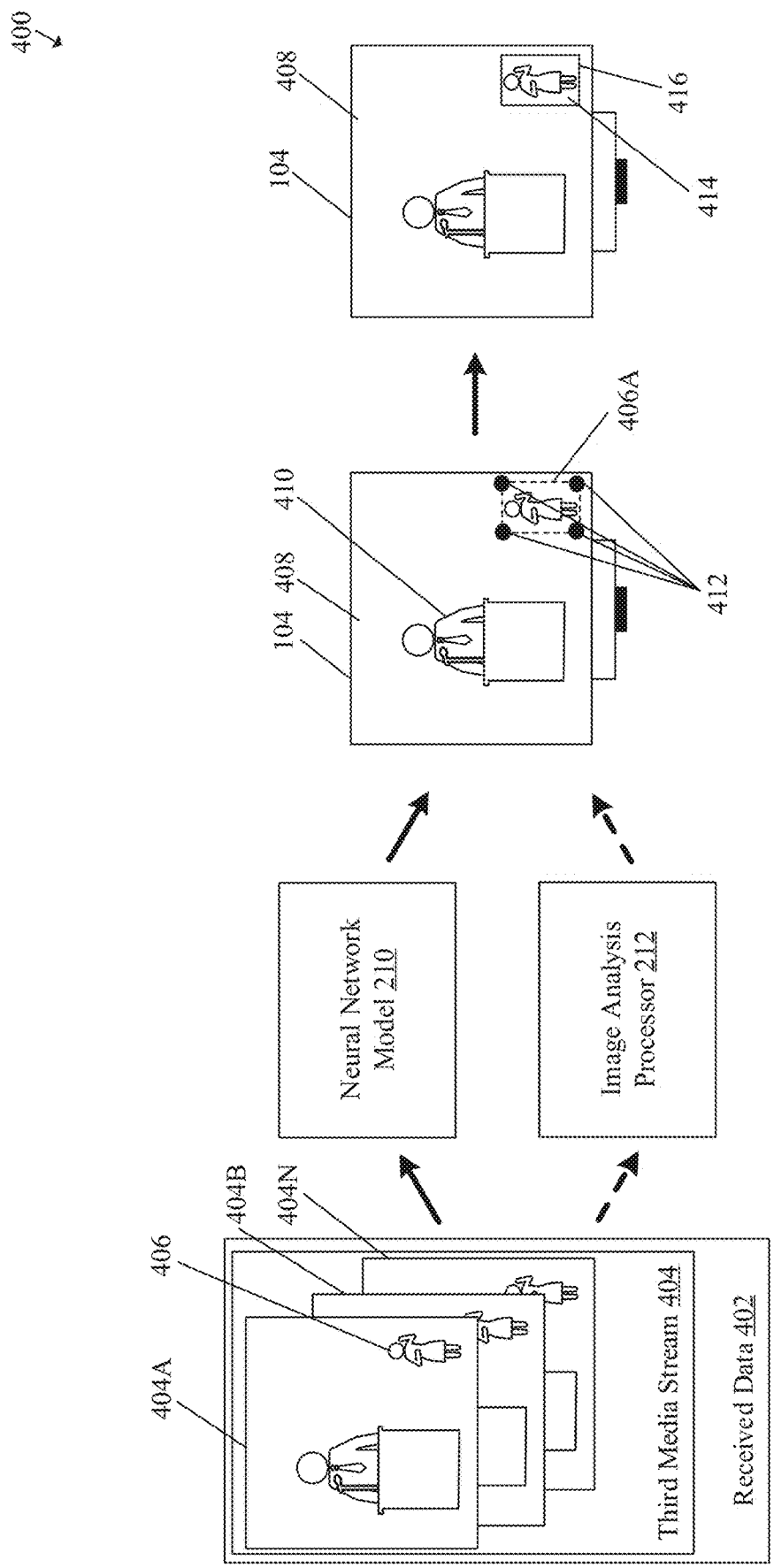
FIG. 4 is a diagram that illustrates an exemplary scenario for display of signing video through an adjustable user interface (UI) element for a live video broadcast, in accordance with an embodiment of the disclosure.

FIG. 4 is a diagram that illustrates an exemplary scenario for display of signing video through an adjustable user interface (UI) element for a live video broadcast, in accordance with an embodiment of the disclosure. FIG. 4 is explained in conjunction with elements from FIGS. 1-3. With reference to FIG. 4, there is shown an exemplary scenario 400. In the exemplary scenario 400, there is shown a block of received data 402. The received data 302 may include a third media stream 404 that includes one or more frames of a live video broadcast. In the exemplary scenario 400, there is further shown a signer 406 who may be present in the live video broadcast. The one or more frames may include a first frame 404A, a second frame 404B, up to an Nth frame 404N. In the exemplary scenario 400, there is further shown a neural network model 210 and a display device 104 associated with the electronic device 102.

The third media stream 404 may include the live video broadcast that may be broadcast by various mediums, such as terrestrial or over-the-air broadcast, streaming broadcast, satellite television broadcast, and so on. For example, the live video broadcast may be encapsulated in the third media stream 404. The live video broadcast may include a main video 408 depicting one or more characters 410. In an embodiment, the third media stream 404 may be received from the server 106 or a server associated with a broadcasting network. In a case where the third media stream 404 is a live video broadcast, the metadata embedded with the third media stream 404 may not include a location of the signer 406 in the live video broadcast. In such cases, the circuitry 202 may be configured to analyze the frames of the live video broadcast to determine the location of the signer 406 in the live video broadcast. For example, the circuitry 202 may be configured to execute image analysis on the one or more frames of the live video broadcast to detect a region (for example, an unchanging background region) of the signer 406 in the video. In another example, the circuitry 202 may be configured to apply the neural network model 210 on the one or more frames of the live video broadcast to detect hand signs associated with the sign language in the video. For example, the circuitry may be configured apply the neural network model 210 on the first frame 404A to detect the hands sign in the first frame 404A. The circuitry 202 may be configured apply the neural network model 210 on the second frame 404B, and so on up to the Nth frame 404N to detect the hands sign in each frame of the video. In another embodiment, the circuitry 202 may be configured to apply the neural network model 210 on the one or more frames of the live video broadcast to distinguish a background of a portion of the video where the signer 406 may be present from the other portions of the video. The neural network model 210 may be configured to predict a bounding box for the location of the signer 406 in the video at a plurality of time-stamps based on the detection of the hand sings or the detection of the background corresponding to the location of the signer 406 in the video.

The neural network model 210 may be a pre-trained model that may be trained to detect the hand signs associated with the sign language (such as the American Sign Language (ASL) or the British Sign Language (BSL)) and output the image coordinates 412 that correspond to the corners of the rectangular region of the video portion that includes the signer 406. The circuitry 202 may be further configured to detect the location of the signer 406 in the video further based on the image coordinates 412. The electronic device 102 may be thereby capable of identifying the location of the signer 406 in the video even in a case where the metadata embedded in the third media stream 404 does not include the location of the signer 406, or in a case where the metadata is absent from the third media stream 404.

In another embodiment, the circuitry 202 may be configured to employ the image analysis processor 212 to perform image analysis (such as object detection) to detect the signer 406 in the video and output the image coordinates 412. The circuitry 202 may detect a region around the signer 406 in the video based on a difference in background color of the region compared to the main video 408, a difference in background shade of the region compared to the main video 408, or a predefined boundary around the signer. For example, the circuitry 202 may be configured to detect the location of the signer 406 in the video (such as the main video 408) in a case where the portion of the video that includes the signer has a background color (or shade) different from the background color (or shade) of the other portions of the video. In another example, the circuitry 202 may be configured to detect an unmoving (static) background region different from the background of the main video 408 to detect the location of the signer 406. In another example, the circuitry 202 may employ edge detection or template matching techniques to detect a border around the signer 406 in a case where the video includes a visible boundary of a predefined shape and color around the signer 406, and may detect the location of the signer 406 in the video based on the detected border. In these scenarios, the circuitry 202 may rely on image analysis techniques that require less computing power compared to the execution of the neural network model 210.

In an embodiment, the circuitry 202 may be further configured to control the display device 104 to render a highlighting border 406A around the signer 406 in the displayed video. The border 406A may be rendered based on the image coordinates 412 of the predicted bounding box. In an example, the circuitry 202 may display the border 406A to obtain user confirmation of the video portion of the signer 406 in the video, in a case where the neural network model 210 identifies multiple candidates as the video portion of the signer 406 in the video. For example, the circuitry 202 may receive a user confirmation for the highlighted candidate by a prompt (Press Ok to confirm; Press right arrow ▶ to view next candidate) displayed on the display device 104. The circuitry 202 may seek user confirmation of the signer 406 in the video in a case where the confidence score of the detection of the signer 406 and/or the prediction of the bounding box may be lower than a threshold score. In another embodiment, the circuitry 202 may seek user confirmation of the signer 406 in the video in a case where the image analysis processor 212 outputs multiple candidates as the video portion of the signer 406 in the video.

The circuitry 202 may be further configured to extract a video portion 414 from the live video broadcast. In an embodiment, the circuitry 202 may be further configured to extract a video portion 414 from the live video broadcast, based on user confirmation of the highlighted candidate. The extracted video portion 414 may correspond to the determined location in the live video broadcast. For example, the video portion 414 may be extracted from the rectangular region of the video. The rectangular region may correspond to an area between the image coordinates 412 and may include the signer 406.

The circuitry 202 may be further configured to control a playback of the video on the display device 104. In an embodiment, the circuitry 202 may be configured to control the playback of the video on the display device 104 based on a user input. The circuitry 202 may be configured to control the display device 104 based on the playback. The circuitry 202 may control the display device 104 render a user interface (UI) element 416 on the display device 104. For example, the UI element 416 may be rendered as a picture-in-picture (PiP) window of an adjustable size. The circuitry 202 may be configured to display the extracted video portion 414 that includes the signer 406 inside the UI element 416.

Figure 5:
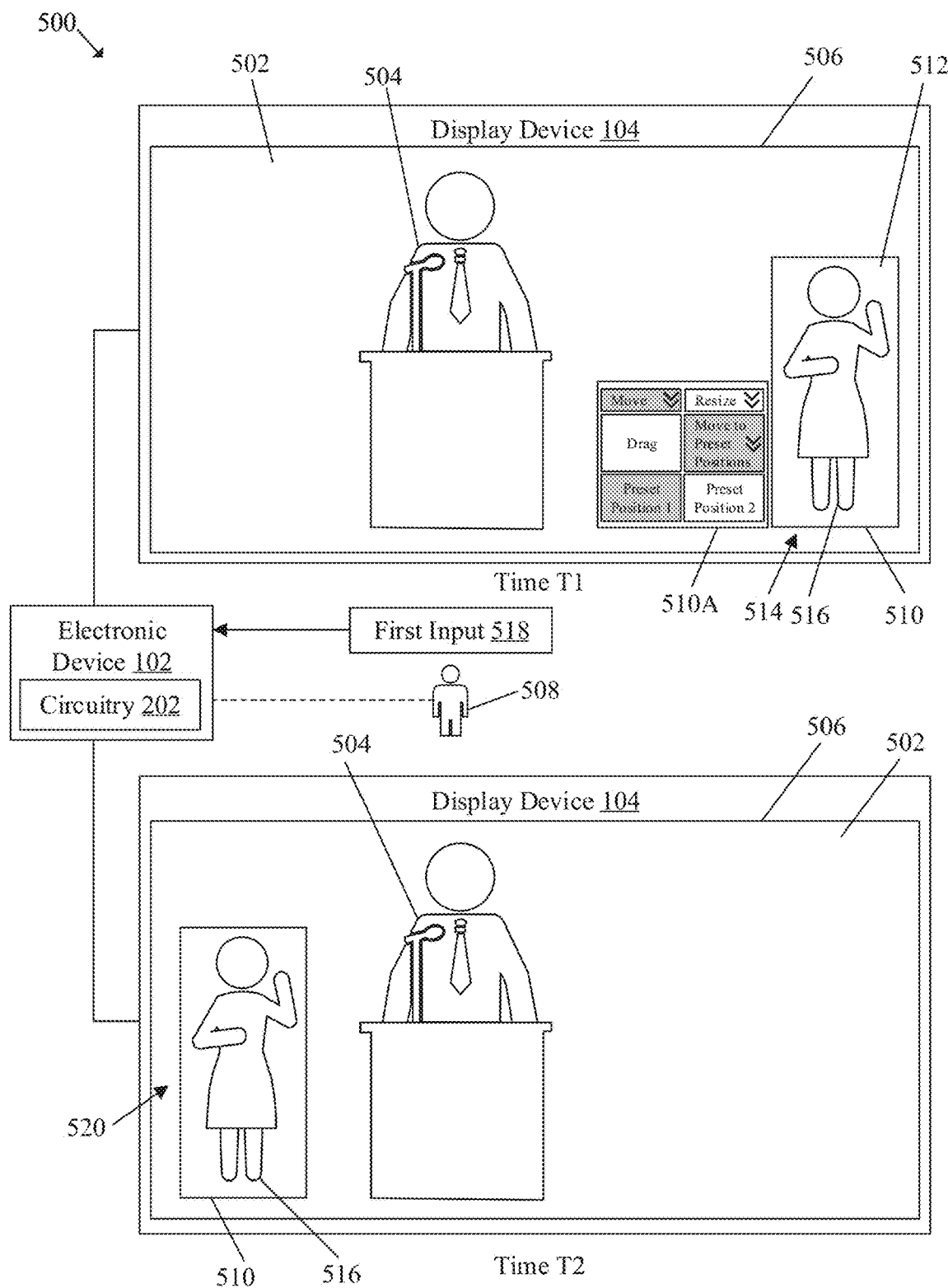
FIG. 5 is a diagram that illustrates an exemplary scenario for adjustment of a position of a user interface (UI) element that displays a signing video, in accordance with an embodiment of the disclosure.

FIG. 5 is a diagram that illustrates an exemplary scenario for adjustment of a position of a user interface (UI) element that displays a signing video, in accordance with an embodiment of the disclosure. FIG. 5 is explained in conjunction with elements from FIGS. 1-4. With reference to FIG. 5, there is shown an exemplary scenario 500. In the exemplary scenario 500, there is shown an electronic device 102 and a display device 104 associated with the electronic device 102. The electronic device 102 may control the display device 104 to display a main video 502 within a display area 506. With reference to FIG. 5, there is further shown a user 508 associated with the electronic device 102.

In an embodiment, the circuitry 202 may be configured to receive a user input that includes a selection of a user profile associated with the user 508. Based on the selected user profile, the circuitry 202 may retrieve one or more user preferences associated with a user interface (UI) element 510 in which an extracted video portion 512 of the signer 516 may be displayed. In some embodiments, the circuitry 202 may retrieve the one or more user preferences from the memory 204. The UI element 510 may be rendered based on the retrieved one or more user preferences. For example, the one or more user preferences may include one or more of a location preference for the UI element 510 within the display area 506 of the display device 104, a theme or a color scheme for the UI element 510, a size preference for the UI element 510, a preference to show/hide the UI element 510, a schedule to render the UI element 510, and a sign language preference (for example, American sign language or British sign language).

The location preference may include a preferred location at which the UI element 510 may be displayed. The circuitry 202 may retrieve a user preference of a first location 514 from a set of locations. The first location 514 may be the preferred location for the display of the UI element 510 according to the user profile of the user 508. As an example, the first location 514 may correspond to the bottom right corner in the display area 506 of the display device 104. The theme or the color scheme for the UI element 510 may correspond to a design or color preference of the selected user profile for the UI element 510. As an example, the theme or color scheme for the UI element 510 may comprise a green background behind a signer 516 or a green color border for the UI element 510. The size preference for the UI element 510 may include a default size predefined by the manufacturer of the electronic device 102. The preference to hide the UI element 510 may correspond to a preference to the user 508 whether to hide or show the UI element 510. The schedule to render the UI element 510 may correspond to a first period in which the UI element 510 may be rendered and a second period in which the UI element 510 may not be rendered. For example, the user preference for the schedule may indicate that the UI element 510 may be rendered between 10:00 AM and 04:00 PM, and that the UI element 510 may be hidden between 04:01 PM and 10:00 PM. In another embodiment, the user preference may comprise an instruction to show the UI element 510 in a case where one of the characters 504 in the main video 502 is speaking, and to hide the UI element 510 in a case where there is no speech in the main video 502.

At time T1, the circuitry 202 may receive the first media stream that may include the video. The video may include the main video 502 depicting a character 504. The circuitry 202 may further receive metadata associated with the video. The circuitry 202 may further determine a location of the signer 516 in the video based on the received metadata. The metadata may include information that describes the location of the signer 516 in the video at a plurality of timestamps. In another embodiment, the circuitry 202 may determine the location of the signer 516 based on image analysis by the image analysis processor 212 or based on the application of the neural network model 210. The circuitry 202 may further extract the video portion 512 that is associated with determined location of the signer 516 in the video. Based on the extracted location, the circuitry 202 may control a playback of the video on the display device 104. The circuitry 202 may further control the display device 104 to render the UI element 510 (such as a PiP window) on the display device 104 at the first location 514 based on the retrieved user preference. The circuitry 202 may control the display device 104 to display the extracted video portion 512 inside the UI element 510. In some embodiments, in a case where the user preference for the location of the UI element 510 is not available in the memory 204, the UI element 510 may overlap with the determined location of the signer 516 in the main video 502, in accordance with a default location predefined by the manufacturer of the electronic device 102. As shown in FIG. 5, the circuitry 202 may control the display device 104 to render the UI element 510 at the bottom right corner of the display area 506 of the display device 104.

The circuitry 202 may receive a first input 518 to change the current location (or the first location 514) of the rendered UI element 510 to a second location 520. The second location 520 may be different from the first location 514. In a case where the electronic device 102 is a television controlled by a remote control, the display device 104 may display a pop-up menu 510A (for example, a context menu) upon selection of the UI element 510. The pop-up menu 510A may include the options "Resize" and "Move". Upon selection of the option "Move" (selection highlighted in gray), the display device 104 may display sub-options "Move to Preset Positions" and "Drag". Upon selection of the option "Move to Preset Positions" (selection highlighted in gray), the display device 104 may display sub-options "Preset Position 1", "Preset Position 2", and so on based on the stored preferences of the selected user profile and/or the default locations set by the manufacturer of the electronic device 102. For example, "Preset Position 1" may correspond to bottom left corner of the display area 506, and "Preset Position 2" may correspond to top left corner of the display area 506. These preset positions may be stored in the memory 204 based on the set preferences of the selected user profile and/or the default locations set by the manufacturer of the electronic device 102. Upon selection of one of the sub-options, the circuitry 202 may control the display device 104 to display the UI element 510 at the second location 520 at time T2. As an example, the second location 520 may correspond to the bottom left corner within the display area 506 of the display device 104. Upon selection of the option "Drag", the display device 104 may highlight the UI element to indicate that the UI element 510 is selected, and may display a prompt to drag the UI element 510 to any arbitrary location within the display area 506 using arrow buttons (▶ ◀ ▼ ▲) on the remote control. In a case where the electronic device 102 is a smart phone with touchscreen input, upon selection of the UI element 510, the display device 104 may display a prompt to drag and move the UI element 510 by touch input to any arbitrary location within the display area 506. The circuitry 202 may control the display device 104 to display the UI element 510 at the second location 520 (for example, the bottom left corner) at time T2 based on the first input 518. The display device 104 may seamlessly continue the playback of the extracted video portion 512 of the signer 516 prior to the movement of the UI element 510, during the movement of the UI element 510, and subsequent to the movement of the UI element 510 in time synchronization with the main video 502.

Figure 6:
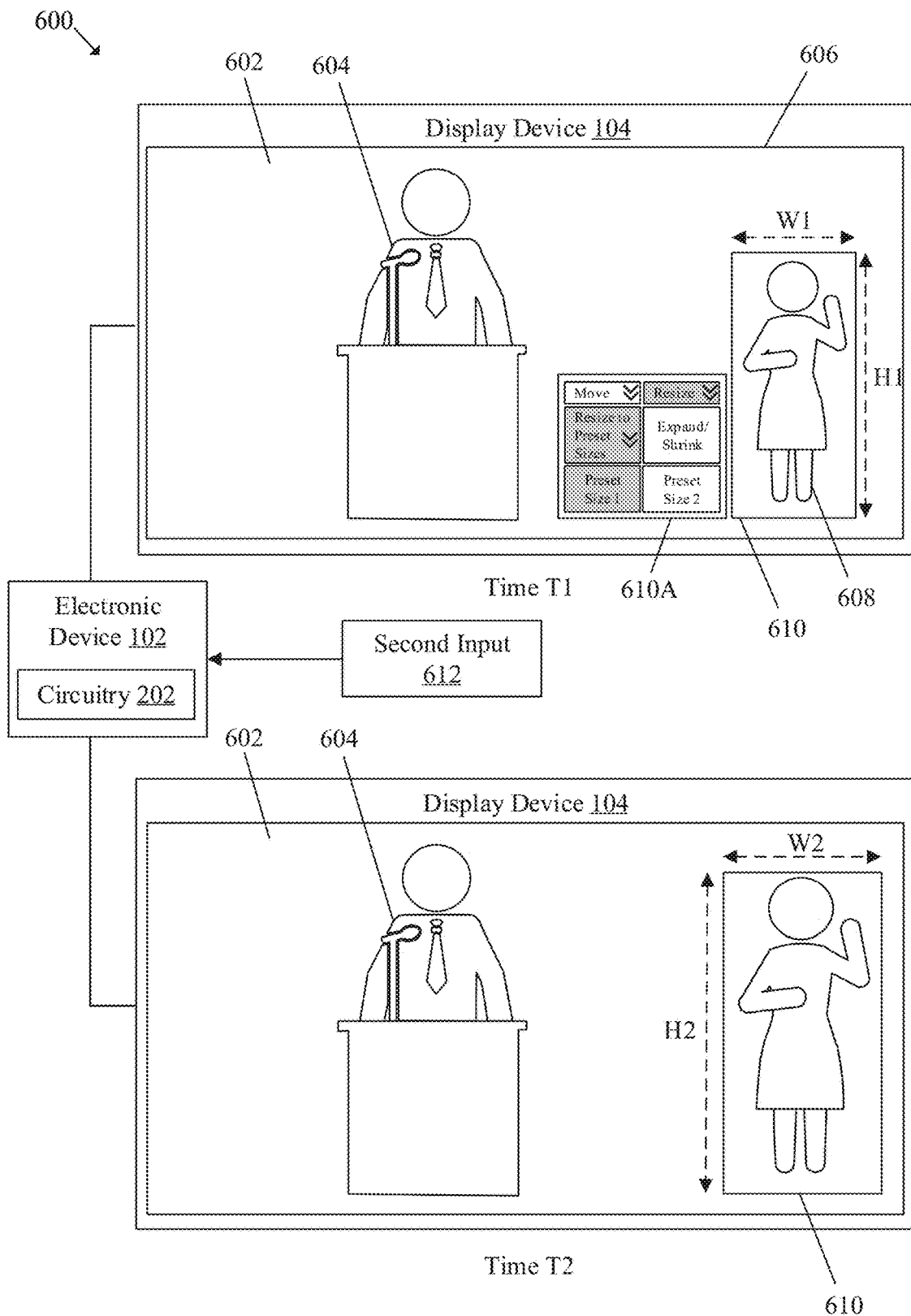
FIG. 6 is a diagram that illustrates an exemplary scenario for adjustment of a size of a user interface (UI) element that displays a signing video, in accordance with an embodiment of the disclosure.

FIG. 6 is a diagram that illustrates an exemplary scenario for adjustment of a size of a user interface (UI) element that displays a signing video, in accordance with an embodiment of the disclosure. FIG. 6 there is shown an exemplary scenario 600. In the exemplary scenario 600, there is shown an electronic device 102 and a display device 104 associated with the electronic device 102. The electronic device 102 may control the display device 104 to display a main video 602 within a display area 606.

In an embodiment, the circuitry 202 may be configured to receive a user input that includes a selection of a user profile. Based on the selected user profile, the circuitry 202 may retrieve one or more user preferences associated with a UI element 610 in which an extracted video portion of the signer 608 may be displayed. In some embodiments, circuitry 202 may retrieve the one or more user preferences from the memory 204. The UI element 610 may be rendered based on the retrieved one or more user preferences. For example, the one or more user preferences may include a size preference for the UI element 610.

At time T1, the circuitry 202 may receive the first media stream that may include the video. The video may include the main video 602 depicting a character 604. The circuitry 202 may further receive metadata associated with the video. The circuitry 202 may further determine a location of a signer 608 in the video based on the received metadata. In another embodiment, the circuitry 202 may determine the location of the signer 608 based on image analysis by the image analysis processor 212 or based on the application of the neural network model 210. The circuitry 202 may further extract a video portion that may correspond to the determined location in the video. Based on the extracted location, the circuitry 202 may be configured to control a playback of the video on the display device 104. The circuitry 202 may be further configured to control the display device 104 to render a user interface (UI) element 610 (such as a PiP window) on the display device 104 in a first size (for example, height H1, width W1) based on the retrieved user preference associated with the selected user profile. In some embodiments, in a case where the user preference for the size of the UI element 610 is not available in the memory 204, the UI element 610 may be displayed based on a default size predefined by the manufacturer of the electronic device 102. As shown in FIG. 6, the circuitry 202 may control the display device 104 to render the UI element 610 in the first size (H1, W1) in the display area 606 of the display device 104.

The circuitry 202 may receive a second input 612 to change the current size (or the first size) of the rendered UI element 610 to a second size. The second size may be different from the first size. In a case where the electronic device 102 is a television controlled by a remote control, the display device 104 may display a pop-up menu 610A upon selection of the UI element 610. The pop-up menu 610A may include the options "Resize" and "Move". Upon selection of the option "Resize" (selection highlighted in gray), the display device 104 may display sub-options "Resize to Preset Sizes" and "Expand/Shrink". Upon selection of the option "Resize to Preset Sizes" (selection highlighted in gray), the display device 104 may display sub-options "Preset Size 1", "Preset Size 2", and so on based on the retrieved preferences of the selected user profile and/or default locations set by the manufacturer of the electronic device 102. For example, the "Preset Size 1" and "Preset Size 2" may correspond to different sizes with fixed aspect ratios, such that the extracted video portion of the signer 608 has an optimum resolution. Upon selection of one of the sub-options, the circuitry 202 may control the display device 104 to display the UI element in a second size (height H2, width W2) at time T2. Upon selection of the option "Expand/Shrink", the display device 104 may highlight the UI element to indicate that the UI element 610 is selected, and may display a prompt to resize the UI element 610 to any arbitrary size within the display area 606 using arrow buttons (▶◀ ▼▲) on the remote control. In a case where the electronic device 102 is a smart phone with touchscreen input, upon selection of the UI element 610, the display device 104 may display a prompt to resize the UI element 610 to any arbitrary size within the display area 606 using touch-based actions (such as, pinch open or pinch closed actions of the fingers). The circuitry 202 may control the display device 104 to display the UI element in the second size (H2, W2) at time T2 based on the second input 612. For example, the circuitry 202 may control the display device 104 to change the current size of the UI element 610 to match the second size (H2, W2). In an embodiment, the circuitry 202 may be configured to upscale or downscale the video portion to match the second size (H2, W2) of the UI element 610 before the video portion is displayed inside the UI element 610. The circuitry 202 may upscale or downscale to change the resolution of the extracted video portion of the signer 608 depending on the modified size of the UI element 610. As shown in FIG. 6, the second size (H2, W2) of the UI element 610 may be greater than the first size (H1, W1) of the UI element 610. In such as case, the circuitry 202 may upscale the extracted video portion of the signer 608 from a lower resolution (for example 720p) to a higher resolution (for example, 1080p).

Figure 7:
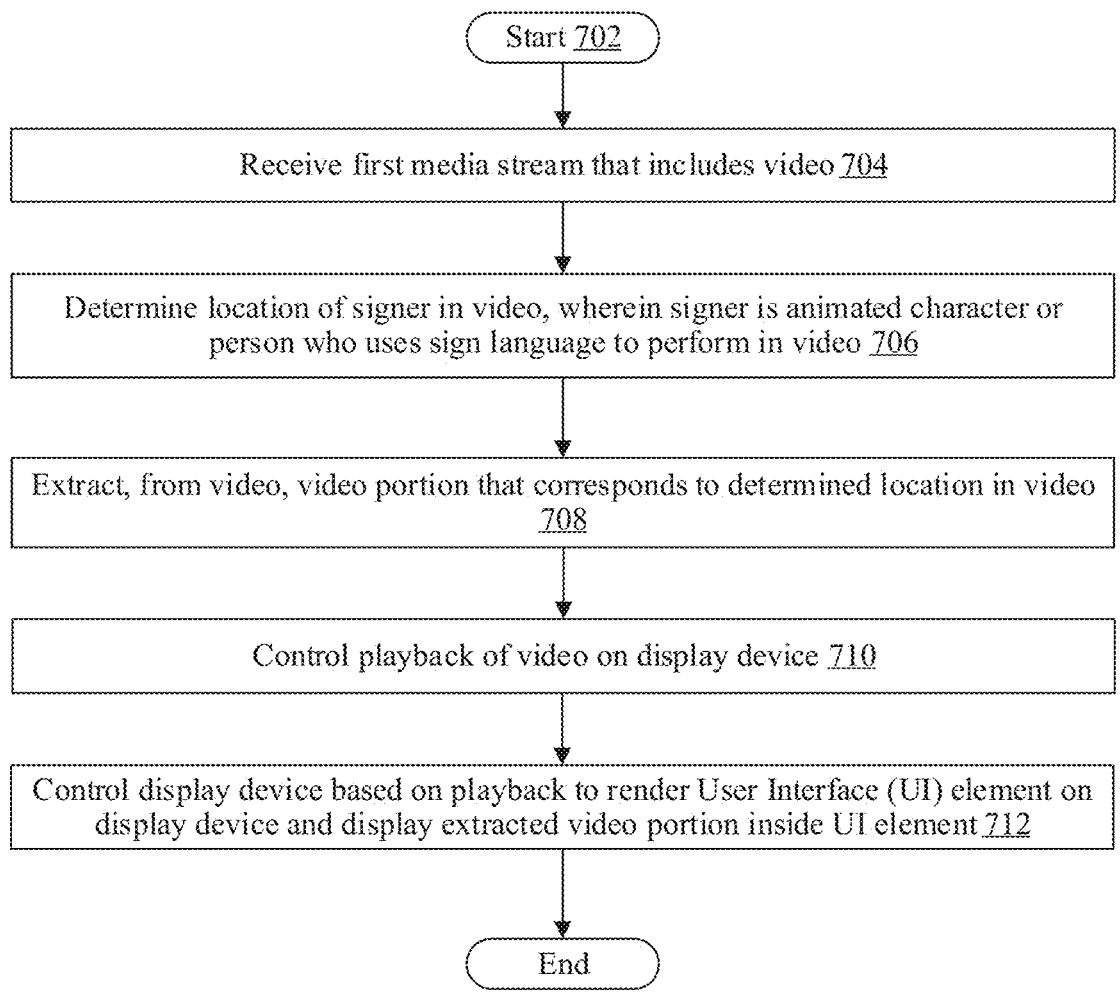
FIG. 7 is a flowchart that illustrates exemplary operations for display of signing video through an adjustable user interface (UI) element, in accordance with an embodiment of the disclosure.

FIG. 7 is a flowchart that illustrates exemplary operations for display of signing video through an adjustable user interface (UI) element, in accordance with an embodiment of the disclosure. FIG. 7 is explained in conjunction with elements from FIGS. 1-6. With reference to FIG. 7, there is shown a flowchart 700. The operations from 702 to 712 may be implemented by any computing system, such as by the electronic device 102 of FIG. 1 or the circuitry 202 of FIG. 2. The operations may start at 702 and may proceed to 704.

At 704, a first media stream that includes a video may be received. In at least one embodiment, the circuitry 202 may be configured to receive the first media stream that includes the video as described, for example, in FIGS. 1, 3, and 4.

At 706, a location of the signer 110 in the video may be determined, wherein the signer 110 may be an animated character or a person who uses a sign language to perform in the video. In at least one embodiment, the circuitry 202 may be configured to determine the location of the signer 110 in the video. The details about the determination of the location of the signer 110 are provided in FIGS. 1, 3, and 4.

At 708, a video portion that corresponds to the determined location in the video may be extracted from the video. In at least one embodiment, the circuitry 202 may be configured to extract the video portion that corresponds to the determined location in the video from the video. The details about the extraction of the video portion are provided, for example, in FIGS. 1, 3, and 4.

At 710, a playback of the video on the display device 104 may be controlled. In at least one embodiment, the circuitry 202 may be configured to control the playback of the video on the display device 104.

At 712, the display device 104 may be controlled based on the playback to render a user interface (UI) element 112 on display device 104 and display extracted video portion inside the UI element 112. In at least one embodiment, the circuitry 202 may be configured to control the display device 104 based on the playback to render the UI element 112 on the display device 104 and display the extracted video portion inside the UI element 112. Details about rendering the UI element 112 are provided, for example, in FIGS. 1, 3, 4, and 5. Control may pass to end.

Various embodiments of the disclosure may provide a non-transitory computer-readable medium and/or storage medium having stored thereon, instructions executable by a machine and/or a computer to operate an electronic device, such as the electronic device 102. The instructions may cause the machine and/or computer to perform operations that include reception of a first media stream that includes a video. The operations may further include determination of a location of a signer (such as the signer 110) in the video. The signer may be an animated character or a person who may use a sign language to perform in the video. The operations may further include extraction, from the video, of a video portion that may correspond to the determined location in the video. The operations may further include control of a playback of the video on a display device (such as the display device 104). The operations may further include control of the display device 104 based on the playback to render a user interface (UI) element (such as the UI element 112) on the display device 104.

Exemplary aspects of the disclosure may include an electronic device (such as the electronic device 102 of FIG. 1) that includes circuitry (such as the circuitry 202) that may be communicatively coupled to a display device (such as the display device 104). In an embodiment, the electronic device 102 may be configured to receive a first media stream that includes a video. The signer 110 may be an animated character or a person who uses a sign language to perform in the video. The electronic device 102 may be configured to determine a location of the signer 110 in the video. The determined location may include image coordinates which correspond to corners of a rectangular region of the video that includes the signer 110.

In accordance with an embodiment, the electronic device 102 may receive metadata associated with the video. The metadata includes information that describes the location of the signer 110 in the video at a plurality of time-stamps. The electronic device 102 may determine the location of the signer 110 in the video based on the received metadata.

In accordance with an embodiment, the electronic device 102 may be configured to detect hand signs associated with the sign language in the video based on application of a neural network model (such as the neural network model 210) on frames of the video. The electronic device 102 may be further configured to detect the location of the signer 110 in the video based on the detection of the hand signs. In such an embodiment, the video may correspond to a live video broadcast.

In accordance with an embodiment, the electronic device 102 may detect a region in the video based on a difference between a background of the region and a background of a remaining portion of the video. The electronic device 102 may detect the location of the signer 110 in the video based on the detection of the region. In another embodiment, the electronic device 102 may detect a border around the signer 110 in the video. The electronic device 102 may detect the location of the signer in the video based on the detection of the border.

In accordance with an embodiment, the electronic device 102 may be configured to extract, from the video, a video portion that corresponds to the determined location in the video. The video portion is extracted from the rectangular region of the video. The electronic device may be further configured to control a playback of the video on the display device 104. The electronic device 102 may be further configured to control the display device based on the playback to render a user interface (UI) element (such as the UI element 112) on the display device 104 and display the extracted video portion inside the UI element 112. The UI element 112 may be rendered as a picture-in-picture (PiP) window of an adjustable size. In an embodiment, the electronic device 102 may be further configured to control the display device 104 to render a border around the signer 110 in the displayed video based on the determined location.

In accordance with an embodiment, the electronic device 102 may receive a first user input that includes one or more user preferences associated with the UI element. The UI element may be rendered based on the received first user input. The one or more user preferences may include a location preference for the UI element 112 within a display area (such as the display area 506) of the display device 104, a theme or a color scheme for the UI element 112, a size preference for the UI element 112, a preference to hide the UI element 112, and a schedule to render the UI element 112.

In accordance with an embodiment, the electronic device 102 may be configured to receive a first input (such as the first input 518) to change a current position of the rendered UI element 112 to a first position that is different from the current position. The electronic device 102 may be further configured to control the display device 104 based on the first input to render the UI element 112 at the first position. The first position may be within the display area 506 of the display device 104.

In accordance with an embodiment, the electronic device 102 may be configured to receive a second input (such as the second input 612) to change a current size of the rendered UI element 112 to a first size different from the current size. The electronic device 102 may be configured to control the display device 104 to change the current size of the rendered UI element 112 to match the first size based on the received second input. The electronic device 102 may be further configured to upscale or downscale the video portion to match the first size of the UI element 112 before the video portion is displayed inside the UI element 112.

In accordance with an embodiment, the electronic device 102 may be configured to receive a second media stream that includes the extracted video portion. The second media stream may be different from the first media stream.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
  circuitry communicatively coupled to a display device, wherein the circuitry is configured to:
    receive a first media stream that includes a video, wherein the video includes a signer that is one of an animated character or a person who uses a sign language to perform in the video;
    detect, by application of a neural network model on frames of the video, hand signs associated with the sign language in the video;
    determine a location of the signer in the video based on the detection of the hand signs, wherein
      the determined location of the signer comprises image coordinates which correspond to corners of a rectangular region of the video that includes the signer;
    receive a first user input regarding the determined location of the signer in the video;
    extract a video portion from the rectangular region of the video based on the received first user input, wherein the video portion corresponds to the determined location of the signer in the video;
    control a playback of the video on the display device; and
    control the display device based on the playback to:
      render a user interface (UI) element on the display device; and
      display the extracted video portion inside the UI element.

2. The electronic device according to claim 1, wherein the UI element is rendered as a picture-in-picture (PiP) window of an adjustable size.

3. The electronic device according to claim 1, wherein the circuitry is further configured to:
  receive metadata associated with the video, wherein the metadata includes information that describes the location of the signer in the video at a plurality of timestamps; and
  determine the location of the signer in the video based on the received metadata.

4. The electronic device according to claim 1, wherein the video corresponds to a live video broadcast.

5. The electronic device according to claim 1, wherein the circuitry is further configured to:
  detect a region in the video based on a difference between a background of the region and a background of a remaining portion of the video; and
  detect the location of the signer in the video based on the detection of the region.

6. The electronic device according to claim 1, wherein the circuitry is further configured to control the display device to render a border around the signer in the video, based on the determined location.

7. The electronic device according to claim 1, wherein the circuitry is further configured to:
  receive a second user input to change a current position of the rendered UI element to a first position that is different from the current position; and
  control the display device based on the second user input, to render the UI element at the first position, which is within a display area of the display device.

8. The electronic device according to claim 1, wherein the circuitry is further configured to:
  receive a third user input to change a current size of the rendered UI element to a first size that is different from the current size;
  control, based on the received third user input, the display device to change the current size of the rendered UI element to match the first size; and
  control the display device to upscale or downscale the video portion to match the first size of the UI element before the video portion is displayed inside the UI element.

9. The electronic device according to claim 1, wherein the circuitry is further configured to receive a second media stream that includes the extracted video portion, and
  the second media stream is different from the first media stream.

10. The electronic device according to claim 1, wherein the circuitry is further configured to receive a fourth user input that includes one or more user preferences associated with the UI element, and
  the UI element is rendered based on the received fourth user input.

11. The electronic device according to claim 10, wherein the one or more user preferences comprise one or more of a location preference for the UI element within a display area of the display device, a theme or a color scheme for the UI element, a size preference for the UI element, a preference to hide the UI element, and a schedule to render the UI element.

12. A method, comprising:
  receiving a first media stream that includes a video, wherein the video includes a signer that is one of an animated character or a person who uses a sign language to perform in the video;
  detecting, by application of a neural network model on frames of the video, hand signs associated with the sign language in the video;
  determining a location of the signer in the video based on the detection of the hand signs, wherein
    the determined location of the signer comprises image coordinates which correspond to corners of a rectangular region of the video that includes the signer;
  receiving a user input regarding the determined location of the signer in the video;
  extracting a video portion from the rectangular region of the video based on the received user input, wherein the video portion corresponds to the determined location of the signer in the video;
  controlling a playback of the video on a display device; and
  controlling the display device based on the playback for:

rendering a user interface (UI) element on the display device; and displaying the extracted video portion inside the UI element.

13. The method according to claim 12, wherein the UI element is rendered as a picture-in-picture (PiP) window of an adjustable size.

14. The method according to claim 12, further comprising:

receiving metadata associated with the video, wherein the metadata includes information that describes the location of the signer in the video at a plurality of timestamps; and determining the location of the signer in the video based on the received metadata.

15. A non-transitory computer-readable medium having stored thereon, computer-executable instructions which, when executed by an electronic device, cause the electronic device to execute operations, the operations comprising:

receiving a first media stream that includes a video, wherein the video includes a signer that is one of an animated character or a person who uses a sign language to perform in the video;

detecting, by application of a neural network model on frames of the video, hand signs associated with the sign language in the video;

determining a location of the signer in the video based on the detection of the hand signs, wherein the determined location of the signer comprises image coordinates which correspond to corners of a rectangular region of the video that includes the signer;

receiving a user input regarding the determined location of the signer in the video;

extracting a video portion from the rectangular region of the video based on the received user input, wherein the video portion corresponds to the determined location of the signer in the video;

controlling a playback of the video on a display device; and controlling the display device based on the playback for:

rendering a user interface (UI) element on the display device; and displaying the extracted video portion inside the UI element.

* * * * *